United States Patent [19]

Parker et al.

[11] Patent Number: 4,913,268
[45] Date of Patent: Apr. 3, 1990

[54] WELDLESS AUTOMOTIVE SHOCK ABSORBER

[75] Inventors: William A. Parker, Manchester; Thomas E. Bartos, Woodhaven; Ronald M. Cowen, Dundee, all of Mich.

[73] Assignee: Ford Motor Company, Dearborn, Mich.

[21] Appl. No.: 938,186

[22] Filed: Dec. 5, 1986

[51] Int. Cl.$^4$ .......... F16F 9/00; B21D 39/00; B60R 19/32; B60R 19/04

[52] U.S. Cl. .......... 188/322.19; 29/509; 293/134; 293/155; 403/242

[58] Field of Search ............ 188/266, 317, 321.11, 188/322.19, 322.5; 267/113; 293/132, 134, 135; 180/274, 275, 276, 277; 92/169.1; 280/668, 702, 709; 29/523, 509; 403/242, 193, 199, 201

[56] References Cited

U.S. PATENT DOCUMENTS

| | | | |
|---|---|---|---|
| 1,292,905 | 6/1919 | Snell | 403/242 X |
| 1,656,222 | 1/1928 | Oakley . | |
| 3,279,051 | 10/1966 | Minshall | 29/523 |
| 3,314,276 | 4/1967 | Peyton et al. . | |
| 3,715,139 | 2/1973 | Tuggle | 293/134 |
| 3,761,116 | 9/1973 | Scheitlin et al. | 29/523 X |
| 3,840,260 | 10/1974 | Wacker et al. | 293/132 |
| 3,921,754 | 11/1975 | Hess | 29/157 X |
| 4,054,312 | 10/1977 | Strader, Jr. . | |
| 4,321,988 | 3/1982 | Rich | 260/668 X |
| 4,482,036 | 11/1984 | Wossner et al. . | |
| 4,484,670 | 11/1984 | Axthammer et al. | 188/222.19 |
| 4,491,160 | 1/1985 | Axthammer et al. . | |
| 4,509,781 | 4/1985 | Dick et al. . | |
| 4,565,260 | 1/1986 | Scheidt et al. . | |
| 4,641,872 | 2/1987 | Lohr et al. | 293/134 |

FOREIGN PATENT DOCUMENTS

| | | | |
|---|---|---|---|
| 1252163 | 3/1965 | Fed. Rep. of Germany | 29/523 |
| 0136526 | 10/1980 | Japan | 29/523 |

Primary Examiner—Robert J. Oberleitner
Attorney, Agent, or Firm—Jerome R. Drouillard; Roger L. May

[57] ABSTRACT

A weldless shock absorber for an automotive vehicle includes an inner cylinder having a piston slidable within the inner cylinder upon a piston rod extending from the inner cylinder, and outer cylinder telescopically engaged with the inner cylinder, a cylinder head maintained within the outer cylinder in contact with the piston rod by means of an annular ring formed from and extending radially inwardly from the outer cylinder wall, and a mounting bracket affixed to the outer cylinder by means of one or more annular rings integrally formed from the outer cylinder and extending radially outwardly from the outer cylinder.

14 Claims, 2 Drawing Sheets

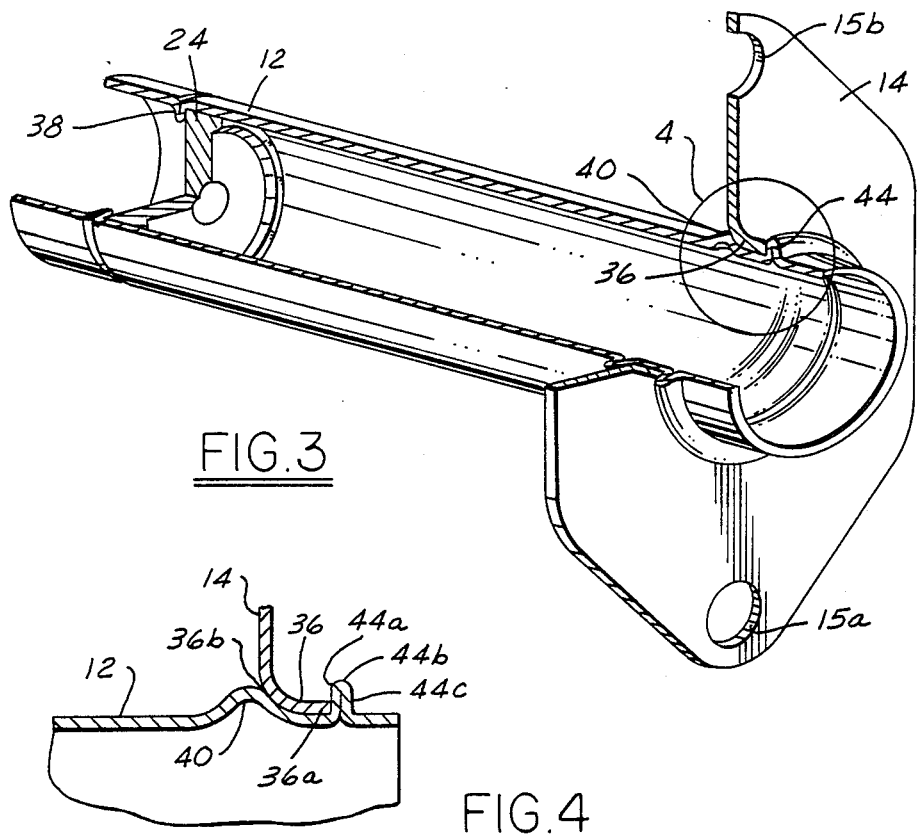
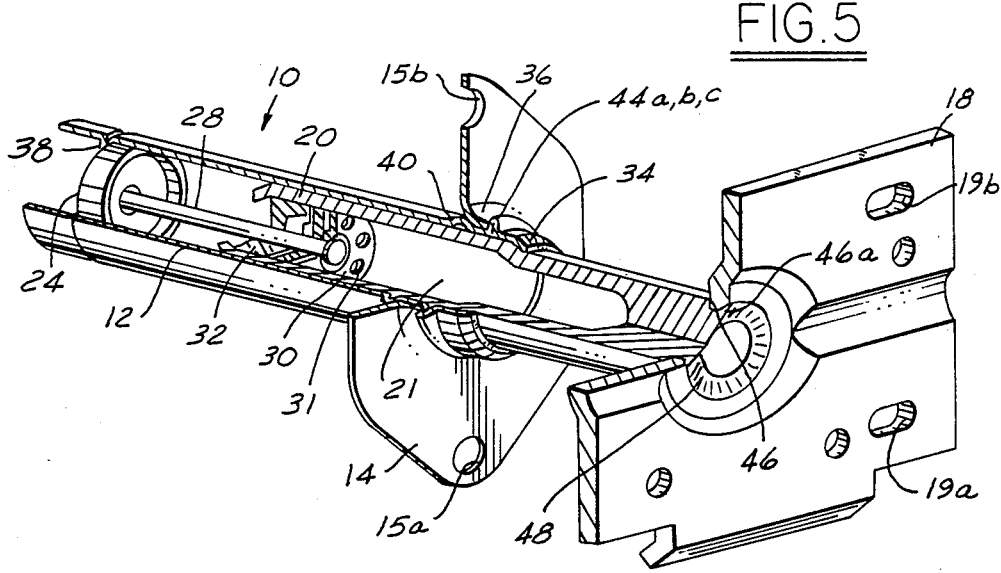

WELDLESS AUTOMOTIVE SHOCK ABSORBER

BACKGROUND OF THE INVENTION

1. Field of the Invention

This invention relates to a weldless shock absorber for use in an automotive vehicle.

2. Disclosure Information

The outer housings of automotive shock absorbers and struts have typically comprised a plurality of mild steel stampings fastened to each other by various welding processes. The mounting brackets for such shock absorbers have also been welded to the body of the shock absorber either by fusion welding or spot welding techniques. Examples of welded brackets are shown in U.S. Pat. Nos. 4,054,312 and 4,509,781. The shock absorbers disclosed in these patents are used for automotive bumpers. An important feature of shock absorbers used for this purpose is the ability to retain the shock absorber in its proper position notwithstanding the imposition of severe axially directed loads. During either a frontal or a rearward impact of a vehicle with either a stationary or a moving object, the bumper is moved inwardly against the resistance provided by the shock absorber.

It has been found through repeated testing that the weakest structural members in a typical shock absorber are the welded joints. In a conventional shock absorber, the mounting bracket is typically secured to the outer cylinder of body with a welded joint. The present invention produces significantly stronger joints for connecting the major components, especially the mounting bracket and outer cylinder, into an improved shock absorber.

Weldless joints have been used for certain of the fastening requirements in automotive shock absorbers. Examples of such joints used for the purpose of retaining the upper piston rod bearing within the shock absorber or strut are shown in U.S. Pat. Nos. 4,482,036, and 4,491,160, as well as in copending U.S. application Ser. No. 816,584. None of these disclosures, however, either teach or suggest the use of a weldless joint to attach the mounting bracket of an automotive shock absorber.

The present invention utilizes a weldless retention system for maintaining the mounting bracket on the outer tube of a shock absorber. This weldless system includes one or more outwardly extending annular rings integrally formed from the shock absorber's outer cylinder. U.S. Pat. Nos. 1,656,222 and 3,314,276 disclose annular rings formed for the purpose of providing a pipe fitting. It is also known to provide an annular ring for locking components of automotive exhaust mufflers together. An example of such a joint is disclosed in U.S. Pat. No. 4,565,260. Such annular rings, have not, however, been employed in the configuration described herein and could not function as a structure for retaining the mounting bracket of an automotive bumper shock absorber against the force arising in a high energy impact of the vehicle.

SUMMARY OF THE INVENTION

A weldless shock absorber for an automotive vehicle comprises a cylinder having an energy absorbing means disposed therein and a mounting bracket, affixed to the cylinder by means of one or more structures formed integrally with the cylinder, for attaching the cylinder to the automotive vehicle. The structures formed integrally with the cylinder for the purpose of retaining the mounting bracket upon the cylinder preferably comprise annular rings extending radially outwardly from the outer diameter of the cylinder and abutting a portion of the mounting bracket. One of the annular rings preferably has a U-shaped cross section with the legs of the U-shaped section abutting each other. The mounting bracket preferably comprises at least one generally planar section with an aperture therein for accepting the cylinder. The aperture preferably is formed by the inside surface of an annular flange affixed to the bracket and extending in the axial direction of the shock absorber. This flange is preferably integral with the bracket. The bracket is preferably fixed to the outer cylinder such that the flange resides between two of the previously described annular rings with one of the rings located at each end of the flange.

It has been found that with use of an integral annular ring having a U-shaped cross section oriented such that the legs of the U-shaped section abut each other, with the bight of the U-shaped section defining the outermost diameter of the annular ring, with the annular ring abutting the axially extending flange of the mounting bracket, and with the legs extending generally perpendicular to the central axis of the outer cylinder, the mounting bracket will be retained upon the outer cylinder in a manner which produces superior results to those yielded by other methods such as fusion or spot welding of the bracket to the outer cylinder.

The weldless shock absorber according to the present invention may comprise an inner cylinder having a piston slidably carried within the inner cylinder and the piston rod upon a piston rod and extending from the inner cylinder, an outer cylinder telescopically engaged with the inner cylinder, a cylinder head maintained within the outer cylinder in contact with the piston rod by means of an annular ring formed from and extending radially inwardly from the outer cylinder wall, and with the annular ring abutting the cylinder head. The weldless shock absorber also includes, as previously described, a mounting bracket affixed to the outer cylinder preferably by means of one or more annular rings integrally formed from the cylinder and extending radially outwardly from the cylinder.

It is an object of the present invention to provide an automotive shock absorber having a basic construction which includes no welded joints.

It is an advantage of the present invention that the shock absorber constructed according to this invention has superior functional attributes as compared to shock absorbers constructed by other means.

It is yet another advantage of the present invention that shock absorbers constructed according to the present invention can be produced with materials having less weight than would be required with other fabrication techniques.

BRIEF DESCRIPTION OF THE DRAWINGS

FIG. 3 is similar to FIG. 2 but shows the automotive shock absorber's mounting bracket in its final position.

FIG. 4 is an enlarged view of the section circumscribed by circle 4 in FIG. 3.

FIG. 5 is a cut-away perspective view of a complete bumper shock absorber made according to the present invention.

Figure 1:
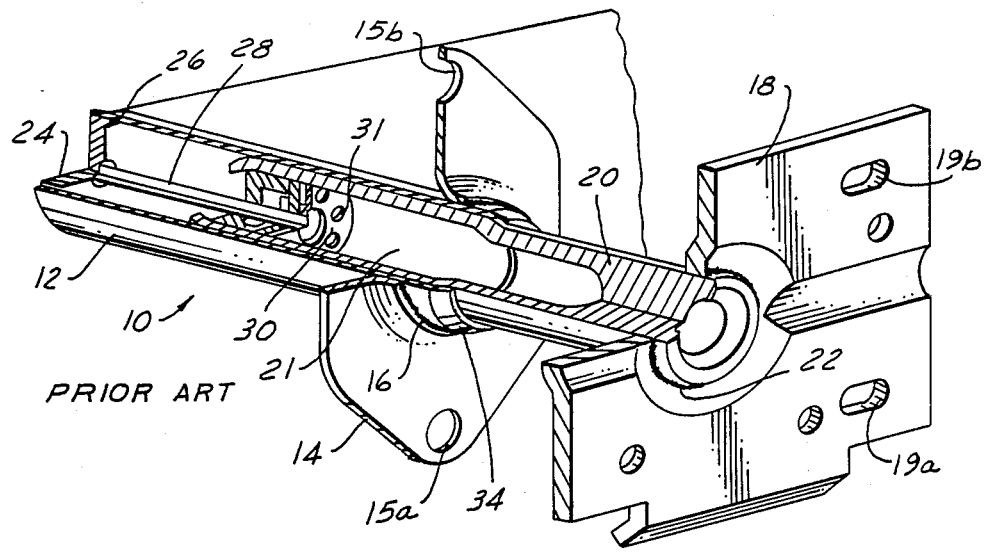
FIG. 1 is a cut-away perspective view of a prior art automotive bumper shock absorber.

Reference numerals found in more than a single figure refer to the same item in each of said figures.

DESCRIPTION OF THE PREFERRED EMBODIMENTS

As generally shown in the figures, an automotive shock absorber 10 comprises an outer cylinder 12 which is typically formed of low carbon steel alloys such as Society of Automotive Engineers (SAE) 1013 steel. Mounting bracket 14 is retained upon the outer diameter of outer cylinder 12. The mounting bracket 14 comprises at least one generally planar section having an integral axially extending flange forming an aperture for accepting the cylinder.

As shown in the enlarged view in FIG. 4, a mounting bracket 14 suitable for use with the present invention has an axially extending annular flange 36 with an end 36a which is abutted to annular flange 44, which will be described in greater detail. The mounting bracket 14 contains apertures 15a and 15b which permit passage of a bolt, rivet or other fastener (not shown) for the purpose of attaching the shock absorber 10 to the body or chassis or another portion of the motor vehicle.

FIG. 1 shows mounting bracket 14 as being attached to outer cylinder 12 by means of weld 16, whereas FIGS. 2-5 disclose a novel structure for attaching mounting bracket 14, which attachment is the subject of the present invention.

Shock absorber 10 also includes bumper bracket 18, which in the case of the shock absorber 10 shown in FIG. 1, is welded to one end of inner cylinder 20 at weld 22. In the weldless shock absorber 10 shown in FIG. 5, however, bumper bracket 18 is staked to the end of inner cylinder 20. In each case, bumper bracket apertures 19a and 19b are provided to allow the passage of fasteners employed for the purpose of attaching the bumper to the bumper bracket.

As with most other types of shock absorber apparatus, the shock absorber 10 which is the subject of this disclosure has energy absorbing capability which is active during linear compression of the shock absorber unit. Thus, inner cylinder 20 is provided with an energy absorbing apparatus. The energy absorbing mechanism includes a shredder 30 having apertures 31. The shredder 30 acts as a piston moving through cavity 21 within the inner cylinder 20. Cavity 21 is filled with a high viscosity semi-liquid or jelly such as jelled silicone. The filler is caused to extrude through the apertures 31 in the shredder 30 as the shredder 30 moves down through cavity 21. The shredder is pushed by push rod 28 which extends between the shredder 30 and cylinder head 24. As shown in FIG. 1, the cylinder head 24 of the prior art shock absorber is maintained in contact with the outer cylinder 12 by weld 26.

Push rod 28 also extends through push rod guide 32. Thus, when a bumper attached to bumper bracket 18 is pushed in a direction so as to cause linear collapsing of the shock absorber 10, the force exerted on the bumper bracket 18 is transmitted by inner cylinder 20 to the filler within cavity 21 and the extrusion of the filler material through shredder apertures 31 then absorbs the energy of the impact.

Figure 2:
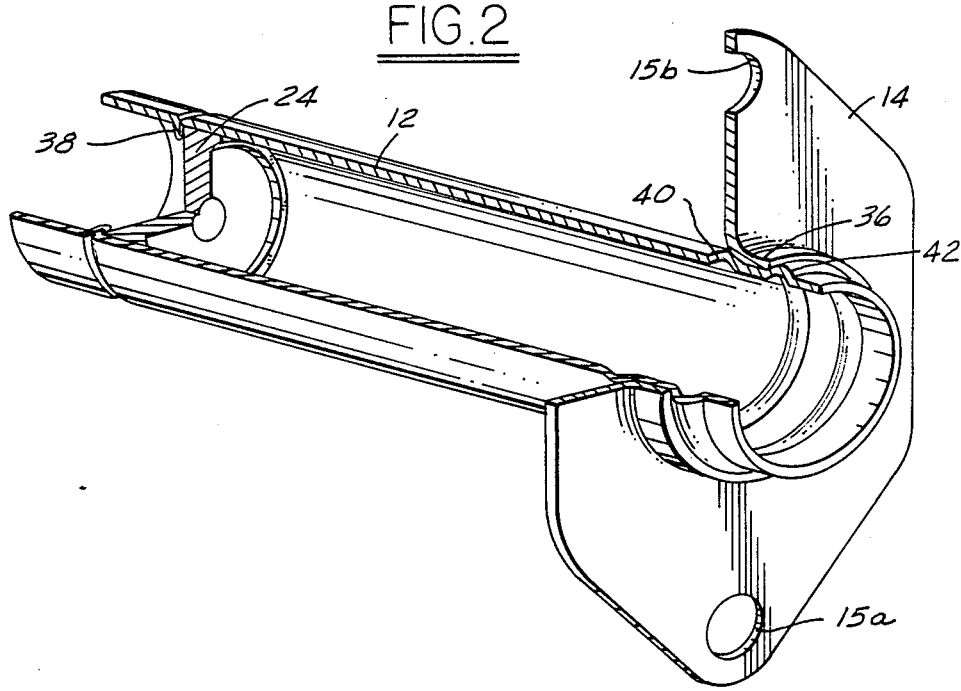
FIG. 2 is a cut-away perspective view of the outer cylinder of the novel bumper shock absorber described herein in an unfinished condition.

FIG. 2 shows the outer cylinder 12 of the novel shock absorber in an unfinished condition. As shown in FIG. 2, annular flange 36, extending from mounting bracket 14, abuts annular ring 40 on one side and annular ring pre-form 42 on its other side.

Outer cylinder 12 is shown in a more finished condition in FIG. 3. As shown in FIG. 3, and with more particularity in FIG. 4, end 36a of annular flange 36 abuts annular ring 44, which comprises the finished form of annular ring pre-form 42. Annular ring 44 comprises a first side 44a, a second side 44c, and bight section 44b. As shown in FIGS. 3 and 4, sections 44a and 44c abut each other and extend generally perpendicular to the axis of outer cylinder 12. Those skilled in the art will appreciate in view of this disclosure that annular ring 40 collapses axially to a small extent when annular ring 44 is finally formed.

An important difference between annular ring 40, which abuts annular flange 36 at surface 36b, and annular ring 44, which abuts annular sleeve 36 at surface 36b, resides in the fact that unlike annular ring 40, annular ring 44 is flattened so that its sides 44a an 44c abut each other. This difference between the annular rings produces an important functional effect. This effect was demonstrated in a test in which the amount of axially directed force required to dislodge mounting bracket 14 from outer cylinder 12 was measured using a Tinius Olsen testing machine. In the first test, an outer cylinder 12 and mounting bracket 14 were assembled using a mild steel tube having an outside diameter of 1.775 inches and a wall thickness of 0.089 inches. The mounting bracket was locked to the outer cylinder 12 in the manner illustrated in FIG. 2 (i.e., annular ring pre-form 42, and not annular ring 44 was employed). In this condition, it was found that a force of 3,000 pounds was required to be developed by the Tinius Olsen machine in order to dislodge the mounting bracket 14 from the outer cylinder 12. In a second test, a mounting bracket 14 was assembled to a tube having the specifications as before, but using the annular ring locking system disclosed in FIGS. 3-5 (i.e., with a flattened annular ring formed to the configuration of annular ring 44). In this case, the amount of force required to dislodge the mounting bracket 14 from the outer cylinder 12 was in excess of 7,000 pounds. This fact is important because the increased holding power of the flattened annular ring 44 has allowed the outside diameter of the exterior cylinder to be reduced to 1.647 inches, at a wall thickness of 0.065 inches, whereas a welded shock absorber required a tube diameter of 1.775 inches and a wall thickness of 0.089 inches. In each case mild steel having an SAE specification of 1013 was used. This size reduction, in turn, has permitted a weight savings for the shock absorber of about one pound over the prior art unit. It is well known in the art that weight savings are frequently crucial to the development of motor vehicles having the enhanced fuel economy characteristics.

FIG. 5 is a cut away perspective view of a completed bumper shock absorber 10 made according to the present invention. As shown in this Figure and in FIGS. 2 and 3, the cylinder head 24 of the shock absorber 10 is retained by means of annular ring 38 extending inwardly from the outer diameter of outer cylinder 12. Use of annular ring 38 obviates the need for a weld employed solely for the purpose of retaining cylinder head 24 within outer cylinder 12. Inner cylinder 20, which is preferably formed of SAE 1524 grade steel, is retained within outer cylinder 12 by means of crimp 34 which is applied to outer cylinder 12. Finally, bumper bracket 18 is retained upon outer cylinder 12 by means of a staked area 48 which engages a tapered surface 46a which is included as part of aperture 46 extending through bumper bracket 18.

Because the shock absorber of the present invention requires no welding in its basic construction, it is possible to manufacture a shock absorber using high speed automatic press equipment so as to produce a very economical part. At the same time, the shock absorber described herein is superior to other prior art shock absorbers because the retention capability of the double annular ring construction applied to the outer cylinder and the mounting bracket is superior to any other known construction. Another advantage of the present system for attaching the mounting bracket to the outer cylinder resides in the fact that the finished shock absorber is easily inspected to assure that the mounting bracket has been properly affixed to the outer cylinder. Those skilled in the art will recognize that welded assemblies must be inspected through destructive testing of the welds, whereas the present system admits of an easily performed visual inspection.

Those skilled in the art will appreciate in view of this disclosure that a mounting bracket of either the type disclosed herein, or of many other types, may be retained by an integral structure formed from the material of the shock absorber's outer cylinder, but having a form other than that of an annular ring. Those skilled in the art will further appreciate that although horizontally mounted shock absorbers are disclosed herein, the present invention is suitable for use with vertically or substantially vertically mounted automotive suspension shock absorbers and struts as well, such as the well known MacPherson strut.

Variations and modifications of the present invention are possible without departing from its spirit and scope as defined by the appended claims.

We claim:

1. A weldless shock absorber for an automotive vehicle comprising:
   a cylinder having an energy absorbing means disposed therein; and
   a mounting bracket affixed to said cylinder, by means of at least two structures formed integrally from said cylinder, for attaching said cylinder to said vehicle, wherein each of said structures formed integrally from said cylinder comprises an annular ring extending radially outwardly from the outer diameter of said cylinder.

2. A weldless shock absorber for an automotive vehicle according to claim 1 wherein at least one of said annular rings has a U-shaped cross section with the legs of said U-shaped section abutting each other.

3. A weldless shock absorber for an automotive vehicle according to claim 2, wherein said mounting bracket is disposed closer to one end of said cylinder than the other end of said cylinder and said annular ring having the legs of said U-shaped cross section abutting each other is disposed closer to said one end of said cylinder than the other of said annular rings.

4. A weldless shock absorber for an automotive vehicle according to claim 1 wherein said bracket comprises at least one generally planar section with an aperture therein for accepting said cylinder.

5. A weldless shock absorber for an automotive vehicle according to claim 4 wherein said aperture for accepting said cylinder is formed by the inside surface of an annular flange fixed to said bracket and extending in the axial direction of said shock absorber.

6. A weldless shock absorber for an automotive vehicle according to claim 5 wherein said flange is integral with said bracket.

7. A weldless shock absorber for an automotive vehicle according to claim 5 wherein said flange is fixed between two of said annular rings with one of said rings located at each end of said flange.

8. A weldless shock absorber for an automotive vehicle comprising:
   a cylinder having an energy absorbing means disposed therein;
   a mounting bracket comprising at least one generally planar section having an integral axially extending flange forming an aperture for accepting said cylinder; and
   at least two integral annular rings formed from said cylinder and extending radially outwardly from the outer diameter of said cylinder with a first one of said annular rings having a U-shaped cross section oriented such that the legs of the U-shaped section abut each other, with the bight of the U-shaped section defining the outermost diameter of said annular ring, and with said annular ring abutting a first end of said axially extending flange.

9. A weldless shock absorber for an automotive vehicle according to claim 8 wherein a second annular ring abuts a second end of said axially extending flange.

10. A weldless shock absorber for an automotive vehicle comprising:
    an inner cylinder having a piston slidably carried within it upon a piston rod extending from said cylinder;
    an outer cylinder telescopically engaged with said inner cylinder;
    a cylinder head maintained within said outer cylinder, in contact with said piston rod, by means of an annular ring formed from and extending radially inwardly from said outer cylinder wall with said annular ring abutting said cylinder head; and
    a mounting bracket affixed to said outer cylinder by means of at least two annular rings integrally formed from said cylinder and extending radially outwardly from said outer cylinder.

11. A weldless shock absorber for an automotive vehicle according to claim 10 wherein at least one of said annular rings extending radially outwardly from said outer cylinder has a U-shaped cross-section oriented such that the legs of the U-shaped section abut each other, with the bight of the U-shaped section defining the outermost diameter of said annular ring, and with said annular ring abutting a portion of said mounting bracket.

12. A weldless shock absorber according to claim 11 wherein said legs of said U-shaped section extend generally perpendicular to the central axis of said outer cylinder.

13. A welding shock absorber for an automotive vehicle comprising:
    a cylinder having an energy absorbing means disposed therein; and
    a mounting bracket affixed to said cylinder, by means of at least two structures formed integrally from said cylinder, for attaching said cylinder to said vehicle, wherein each of said structures formed integrally from said cylinder comprises an annular ring extending radially outwardly from the outer diameter of said cylinder and said annular rings are axially disposed from each end of the cylinder.

14. A weldless shock absorber for an automotive vehicle comprising:
   a cylinder having an energy absorbing means disposed therein; and
   a mounting bracket affixed to said cylinder, by means of at least two structures formed integrally from said cylinder, for attaching said cylinder to said vehicle, wherein each of said structures formed integrally from said cylinder comprises an annular ring extending radially outwardly from the outer diameter of said diameter and both of said annular rings have U-shaped cross sections.

* * * * *